US008629895B2

(12) United States Patent
Lee (10) Patent No.: US 8,629,895 B2
(45) Date of Patent: Jan. 14, 2014

(54) CAMERA-BASED FACIAL RECOGNITION OR OTHER SINGLE/MULTIPARTY PRESENCE DETECTION AS A METHOD OF EFFECTING TELECOM DEVICE ALERTING

(75) Inventor: Vandy Lee, Colts Neck, NJ (US)

(73) Assignee: Avaya Inc., Basking Ridge, NJ (US)

( * ) Notice: Subject to any disclaimer, the term of this patent is extended or adjusted under 35 U.S.C. 154(b) by 733 days.

(21) Appl. No.: 12/828,423

(22) Filed: Jul. 1, 2010

(65) Prior Publication Data
US 2011/0043602 A1 Feb. 24, 2011

Related U.S. Application Data (60) Provisional application No. 61/235,838, filed on Aug. 21, 2009.

(51) Int. Cl.
*H04N 7/15* (2006.01)
*H04M 3/42* (2006.01)
*G06F 3/01* (2006.01)

(52) U.S. Cl.
USPC .......... 348/14.03; 175/25; 345/158; 345/467; 348/14.07; 348/14.08; 348/14.09; 348/41; 379/93.21; 379/202.01; 382/103; 434/257; 455/416; 705/7.13; 709/204; 709/205; 709/224; 715/753; 715/758; 725/24

(58) Field of Classification Search
USPC ......... 345/467, 158; 348/14.03, 14.08, 14.09, 348/14.07, 41; 709/204, 224, 205; 715/753, 715/758; 382/103; 434/257; 175/25; 379/93.21, 202.01; 455/416; 705/7.13; 725/24
See application file for complete search history.

(56) References Cited

U.S. PATENT DOCUMENTS

| 5,491,743 | A | * | 2/1996 | Shiio et al. ..................... 709/204 |
| 5,594,469 | A | * | 1/1997 | Freeman et al. ............... 345/158 |
| 5,852,656 | A | * | 12/1998 | Sato et al. ................... 379/93.21 |
| 6,160,899 | A | * | 12/2000 | Lee et al. ....................... 382/103 |
| 6,272,231 | B1 | * | 8/2001 | Maurer et al. ................. 382/103 |
| 6,301,370 | B1 | * | 10/2001 | Steffens et al. ............... 382/103 |
| 6,894,714 | B2 | * | 5/2005 | Gutta et al. ................. 348/14.07 |
| 6,920,942 | B2 | * | 7/2005 | Koederitz ........................ 175/25 |
| 7,018,211 | B1 | * | 3/2006 | Birkholzer et al. ........... 434/257 |
| 7,225,227 | B2 | * | 5/2007 | Omura et al. ................. 709/205 |
| 7,231,423 | B1 | * | 6/2007 | Horstmann et al. .......... 709/204 |
| 7,598,942 | B2 | * | 10/2009 | Underkoffler et al. ........ 345/158 |

(Continued)

OTHER PUBLICATIONS

International Search Report for International (PCT) Patent Application No. PCT/US10/44190, mailed Sep. 27, 2010.

(Continued)

*Primary Examiner* — Gerald Gauthier
(74) *Attorney, Agent, or Firm* — Sheridan Ross P.C.

(57) ABSTRACT

A camera can be associated with each conference participant endpoint. The camera, either frame or video-based, can monitor and detect one or more of gestures, facial recognition, emotions, and movements of the conference participant. Based on the detection of one or more of these triggering events, a correlation to an action corresponding the triggering event can be evoked. For example, if a participant raises their hand, e.g., a triggering event, the system can recognize that this is a request to speak. The participant can then be queued in the system based, for example, relative to other participants' requests. When the other participants have finished speaking, and it is the time for the user who raised their hand to speak, the system can optionally queue the user by modifying the endpoint with which they are associated.

20 Claims, 3 Drawing Sheets

(56) References Cited

U.S. PATENT DOCUMENTS

| | | | |
|---|---|---|---|
| 7,607,097 B2 * | 10/2009 | Janakiraman et al. | 715/753 |
| 7,761,505 B2 * | 7/2010 | Krzyzanowski et al. | 709/204 |
| 7,984,099 B1 * | 7/2011 | Horstmann et al. | 709/204 |
| 7,999,843 B2 * | 8/2011 | Ohba et al. | 348/41 |
| 8,295,462 B2 * | 10/2012 | Miller et al. | 379/202.01 |
| 8,325,214 B2 * | 12/2012 | Hildreth | 348/14.03 |
| 8,351,586 B2 * | 1/2013 | Ali-Vehmas | 379/202.01 |
| 8,417,551 B2 * | 4/2013 | Collet et al. | 705/7.13 |
| 8,503,654 B1 * | 8/2013 | Ludwig | 379/202.01 |
| 2007/0100986 A1 * | 5/2007 | Bagley et al. | 709/224 |
| 2007/0115348 A1 | 5/2007 | Eppel et al. | |
| 2008/0227438 A1 * | 9/2008 | Fletcher | 455/416 |
| 2009/0015659 A1 * | 1/2009 | Choi | 348/14.09 |
| 2009/0079813 A1 | 3/2009 | Hidreth | |
| 2009/0187935 A1 * | 7/2009 | Pellinat et al. | 725/24 |
| 2010/0013905 A1 | 1/2010 | Kumar et al. | |
| 2010/0131866 A1 * | 5/2010 | Nielsen et al. | 715/758 |
| 2010/0220172 A1 * | 9/2010 | Michaelis | 348/14.08 |
| 2010/0253689 A1 * | 10/2010 | Dinicola et al. | 345/467 |
| 2011/0029893 A1 * | 2/2011 | Roberts et al. | 715/753 |
| 2011/0043602 A1 * | 2/2011 | Lee | 348/14.09 |

OTHER PUBLICATIONS

Written Opinion for International (PCT) Patent Application No. PCT/US10/44190, mailed Sep. 27, 2010.

International Preliminary Report on Patentability for International (PCT) Patent Application No. PCT/US2010/044190, mailed Mar. 1, 2012 6 pages.

* cited by examiner

CAMERA-BASED FACIAL RECOGNITION OR OTHER SINGLE/MULTIPARTY PRESENCE DETECTION AS A METHOD OF EFFECTING TELECOM DEVICE ALERTING

RELATED APPLICATION DATA

This application claims the benefit of and priority under 35 U.S.C. §119(e) to U.S. Patent Application No. 61/235,838, filed Aug. 21, 2009, entitled "MOJO," which is incorporated herein by reference in its entirety.

FIELD

An exemplary aspect is directed toward facilitating communications. Even more particularly, an exemplary aspect is directed toward use of one or more of facial and gesture recognition to trigger events, such as a desire to speak, and enqueuing these events based on other meeting participants' request. Another exemplary aspect is directed toward a dynamic agenda based on the one or more triggering events.

BACKGROUND

Teleconferences allow one or more parties to exchange information via a communications network. This information can include one or more of audio information, video information, and multimedia information. Traditionally, telephone conferences have been phone-based between two or more parties that may or may not be collocated in the same geographic area. These teleconferences allow any party on the conference to interject information as they see fit. Certain enhancements to more sophisticated teleconference environments also allow the moderator to regulate certain aspects of the conference, such as muting certain channels, amplifying certain channels, allowing the use of whisper channels, and the like.

SUMMARY

However, in a conference environment, it can be difficult to determine who is speaking, who desires to speak, and what gestures should trigger (if any) certain events to occur. For example, in a multiparty conference, with several individuals who desire to speak, there is a need to organize and structure the speakers in accordance with that desire. Today, there can be overlapping speakers with no ability to determine who is speaking, nor who should speak next.

In accordance with one exemplary embodiment, a camera can be associated with each conference participant endpoint. The camera, either frame or video-based, can monitor and detect one or more of gestures, facial recognition, emotions, and movements of the conference participant. Based on the detection of one or more of these triggering events, a correlation to an action corresponding to the triggering event can be evoked.

For example, if a participant raises their hand, e.g., a triggering event, the system can recognize that this is a request to speak. The participant can then be queued in the system based, for example, relative to other participants' requests. When the other participants have finished speaking, and it is the time for the user who raised their hand to speak, the system can optionally queue the user by modifying the endpoint with which they are associated.

For example, the system can one or more of illuminate a light, provide a message, send a visual or audio trigger or cue to the endpoint associated with the user, or comparable notification that alerts the users they are next to speak. In the event of messaging, this could be enhanced with a dynamic agenda that can be sent to one or more conference participants thereby providing to one or more of the conference participants the order in which participants are to speak. Similarly, messages could be sent to one or more endpoints and/or other communications devices associated with the user, for example on another channel or communications modality such as email, SMS or the like.

In accordance with another exemplary embodiment, one or more of facial recognition and gesture recognition can be used to assist with determining when a conference participant has finished speaking in order to queue the next participant who wishes to speak. This can be expanded to another aspect of the invention which is related to camera-based gesture recognition, through the use of a camera-based gesture recognition engine, in order to determine, recognize, and perform one or more actions based on recognized facial/body gestures.

Even further aspects are directed toward controlling flow of discussion in a conference call environment where one or more participants can request to be entered into the queue for speaking with the system, queuing speakers at least based on their request and optionally on secondary information such as, but not limited to, job position, moderators preferences, ranking, title, or in general any information that can be used to determine a priority.

Even further aspects relate to triggering endpoint modification to secure the attention of a user at an endpoint. For example, a server can assign priorities to persons who want to speak, based on a raised hand or other gesture and then highlight their endpoint when it is their turn. This information can be presented to the user, and, for example, based on facial or endpoint recognition, provide a dynamic agenda, e.g., a list in a multimedia conference environment, to one or more meeting participants as the meeting progresses. This information can be dynamically updated as the conference progresses to reflect who has/is spoken and who is up next.

Another aspect is directed toward the ability to use in conjunction with any of the above aspects the ability to track one or more of motions and gestures to ensure the speaker is always in focus. This can be realized in cooperation with the dynamic agenda that monitors presenters as discussed above.

Accordingly, aspects of the invention are directed toward triggering an activity based on a detected action(s) in a communications environment.

Additional aspects are directed toward detecting one or more of emotions, gestures, and facial expression(s) and triggering an activity in a communications environment.

Additional aspects are directed toward the creation and management of a dynamic agenda that is populated based on a conference participant's request to speak, (or other detectable action) which is correlatable to a triggering event(s).

Additional aspects are directed toward mapping one or more triggering events to a corresponding action in the communications environment.

Even further aspects are directed toward managing a conference environment based on one or more of facial recognition, gesture recognition, and emotion recognition.

Even further aspects are directed toward notifying a conference participant of one or more of their position in an agenda, being next in an agenda, and it being their turn to speak in a communications environment.

Even further aspects are directed toward distributing the dynamic agenda to one or more destinations, such as a communications endpoint associated with one or more users in a conference environment.

Even further aspects are directed toward ranking conference participants whose request to speak conflicts with one another.

Even further aspects are directed toward managing a conference environment based on one or more of facial recognition, gesture recognition, and emotion recognition in combination with speech recognition.

These and other advantages will be apparent from the disclosure contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments of the invention will be described in detail, with reference to the following figures, wherein.

DETAILED DESCRIPTION

Some embodiments will be illustrated below in conjunction with an exemplary communication system or environment. Although well suited for use with, e.g., a system using switch(es), server(s) and/or database(s), communications endpoints, wired and/or wireless communication equipment, etc., the embodiments are not limited to use with any particular type of communication system or configuration of system elements. Those skilled in the art will recognize that the disclosed techniques may be used in any communication application or environment in which it is desirable to provide enhanced conferencing.

Figure 1:
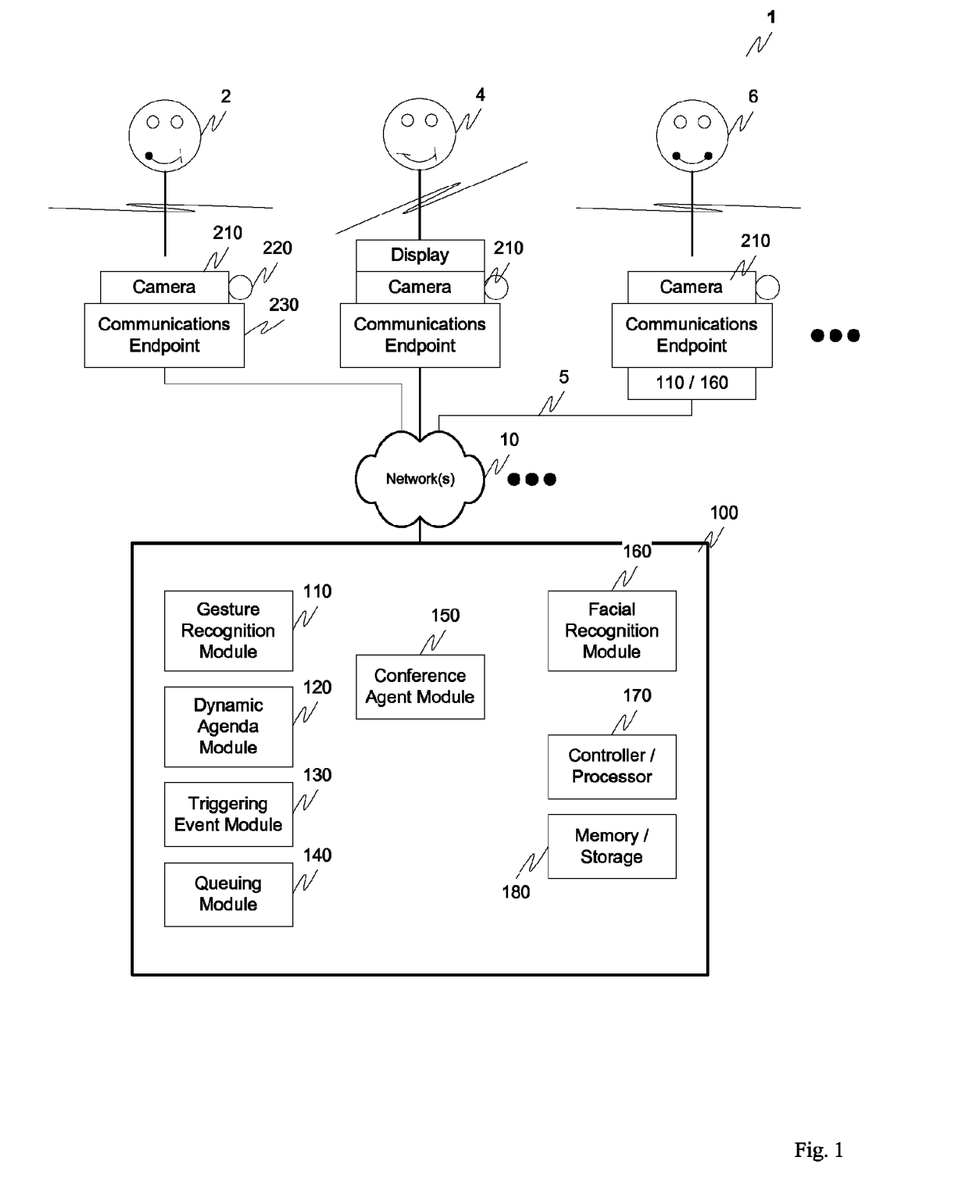
FIG. 1 illustrates an exemplary communications environment.

Referring initially to FIG. 1 an exemplary communication environment 1 will be described in accordance with at least some embodiments. The communication system comprises (in addition to well-known componentry) a communication network 10 connecting a plurality of communication devices, internet information sources, and the like.

In one embodiment, the communication environment may include a switch that may include a private branch exchange (PBX) system or any similar type of switching system capable of providing a telephone and/or conference service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call(er or ing) participants, servers and databases. The switching fabric can provide the functionality to direct incoming and/or outgoing calls to various endpoints and further provides for conferencing capabilities between endpoints as well as the ability to forward information associated with presence.

Communication devices associated with the participants may be packet-switched or circuit-switched and can include, for example, IP telephones such as Avaya Inc.'s, 96xx Series IP Phones™, IP softphones such as Avaya Inc.'s IP Softphone™, Personal Digital Assistants or PDAs, smart phones, Personal Computers or PCs, laptops, packet-based H.320 video phones and conferencing units, packet-based voice messaging and response units, packet-based traditional computer telephony adjuncts, and conventional wired or wireless telephones. Additional devices associated with the participants may be computer-based internet browsers and/or applications specific to a particular communications modality.

FIG. 1 illustrates an exemplary communications environment 1. The communications environment 1 includes one or more conference participants, such as conference participants 2, 4, and 6, and their associated conference hardware. As an example, the conference hardware can include the communications endpoint 230, such as a telephone, video communications endpoint, multimedia endpoint, and in general any communications endpoint that allows one or more of transmission and reception of communication information. Additionally, a camera 210, either video or still, can be associated with the communications endpoint as well as an indicator 220, such as a light, speaker, graphical user interface, display, or the like. The endpoint can also include one or more microphones.

In addition, the communications environment 1 includes alerting system 100 connected to the various communications endpoints via one or more networks 10 and links 5. The alerting system 100 includes a gesture recognition module 110, a dynamic agenda module 120, a triggering event module 130, a queuing module 140, a conference agent module 150, a facial recognition module 160, processor 170, and memory or storage 180. In accordance with another exemplary embodiment, the gesture recognition module 110 and facial recognition module 160 can be collocated with an endpoint as illustrated in FIG. 1.

In operation, the alert system 100 monitors a conference commencing between the various communications endpoints, and associated participants. In general, and in conjunction with one or more of the gesture recognition module 110 and facial recognition module 160, one or more triggering events are detected. As discussed, a triggering event can be any change, or lack thereof, in a participant during a conference. For example, a change in facial expression, gesturing, such as raising of a hand, standing up, leaning back in a chair, or in general any gesture, can be used as the basis of a triggering event.

If it is determined that one of these changes is a triggering event, the triggering event can be correlated to a corresponding action. As a general example, assume participant 4 raised their hand thereby expressing an interest to speak during the conference. Via triggering event module 130, cooperating with the queuing module 140, and optionally the processor 170 and memory 180, this triggering event is detected by the camera and then correlated to one or more actions that could be handled in various ways.

In accordance with a first example, the triggered action is queued in the queuing module 140 until an appropriate time. For example, an appropriate time can be when there is a pause in the conversation, at which point the alerting system 100, cooperating with the queuing module 140, can provide an indicator, either audibly or graphically to participant 4, via, for example, the indicator 220, that their triggering event was recognized, and it is their turn to speak. Moreover, the queuing module 140 can cooperate with one or more of the gesture recognition module 110 and facial recognition module 160 to provide real-time or near-real time information to various participants as to whether something they were doing caused a triggering action to be detected. The detection of a triggering action can be communicated to the participant, for example via the display, or audibly, or in some other manner, as well as optionally the participant notified as to which triggering action their activity invoked. As yet another optional embodiment, the participant can be provided with the ability to override and/or cancel an action associated with the triggering event, in, for example, the situation where the participant changes their mind, or their action was misinterpreted.

In accordance with another embodiment, the conference environment can be managed based on one or more of facial recognition, gesture recognition, and emotion recognition in combination with speech recognition. For example, another type of triggering event could be the detection of certain words, phrases or the like and this optionally combined with one or more of the above used to trigger a corresponding action(s).

In accordance with another exemplary embodiment, communications commence between one or more participants, such as a multimedia conference. As before, triggering events, in conjunction with the gesture recognition module 110 and facial recognition module 160 are detected at one or more communications endpoints associated with the respective participants. Depending on the nature of the triggering event, a corresponding action can be queued based on a correlation of the detected triggering event(s) to a corresponding action. For example, storage 180 can store a look-up table that includes a list of triggering events, and a list of corresponding actions. This look-up table can be update, edited, or modified by one or more of a conference moderator, participant, or in general any entity, as well as be dynamically updated based, for example, on feedback received from one or more participants as triggering events are detected, and the participants either accepting or overriding those events through feedback provided via, an endpoint device (not shown) associated with the communications endpoint.

As an optional example, conference participants can be provided with a key or legend that informs them of the triggering events and the corresponding action thereby facilitating the conference participant's ability to use the correct action/gesture to select the corresponding correct action— this could also help eliminate the detection of unwanted gestures since the participants will be aware of what gestures will be detected and what actions triggered.

For example, the conference agent module 150, upon receiving feedback from one or more various participants as to whether their triggering event was appropriately detected, can provide this feedback as appropriate to optionally update the look-up table.

As will be appreciated, the conference may have an agenda associated therewith comprising a number of agenda items that generally govern the flow of the conference. However, depending on the nature of the triggering event, there may be a need by the conference agent module 150 to modify this agenda. For example, an agenda can be uploaded to the alert system 100 and stored in storage 180, with the system providing, optionally in cooperation with the moderator and/or one or more participants, an indication as to which agenda point is currently being discussed, which agenda point is on deck, and the like, to facilitate conference flow.

However, as various triggering events are detected, there may be a need to update the agenda, which is accomplished in cooperation with the dynamic agenda module 120. For example, upon the detection of a triggering event, and the corresponding action, a determination can be made as to whether a conflict exists between the determined action and the current agenda or agenda items. These conflicts can be based on one or more of rules, timelines, moderator preferences, or in general any criteria that can be used to resolve conflicts between one or more agenda items.

If it is determined that a conflict does exist, numerous factors can be investigated in an effort to determine where queuing module 140 should queue the agenda item in the dynamically updatable agenda. Once the appropriate insertion point for the triggered action is determined, and cooperating with the dynamic agenda module 120, the agenda can be dynamically updated, and when the system reaches that agenda point, or just before, the participant associated with that triggering action notified that it is their turn. In addition, the dynamic agenda can be presented to one or more of the conference participants, so that they can see in real-time or near-real time what the effects of their triggered action were, and where their action is inserted into the agenda. This holds true for other participants as well with optionally all updated agenda items being displayable in the dynamic agenda.

This process can continue throughout the conference, as more and more triggering events are detected, appreciating that the dynamic agenda module 120 can again resolve conflicts, and insert the various triggering actions in the agenda as appropriate. It should also be appreciated that some triggering actions may have higher or lesser importance based on, for example, the nature of the triggering event, a "rank" associated with participant, or some other quantity can be used to either prioritize, or de-prioritize, a certain triggering event within the alert system 100.

Figure 2:
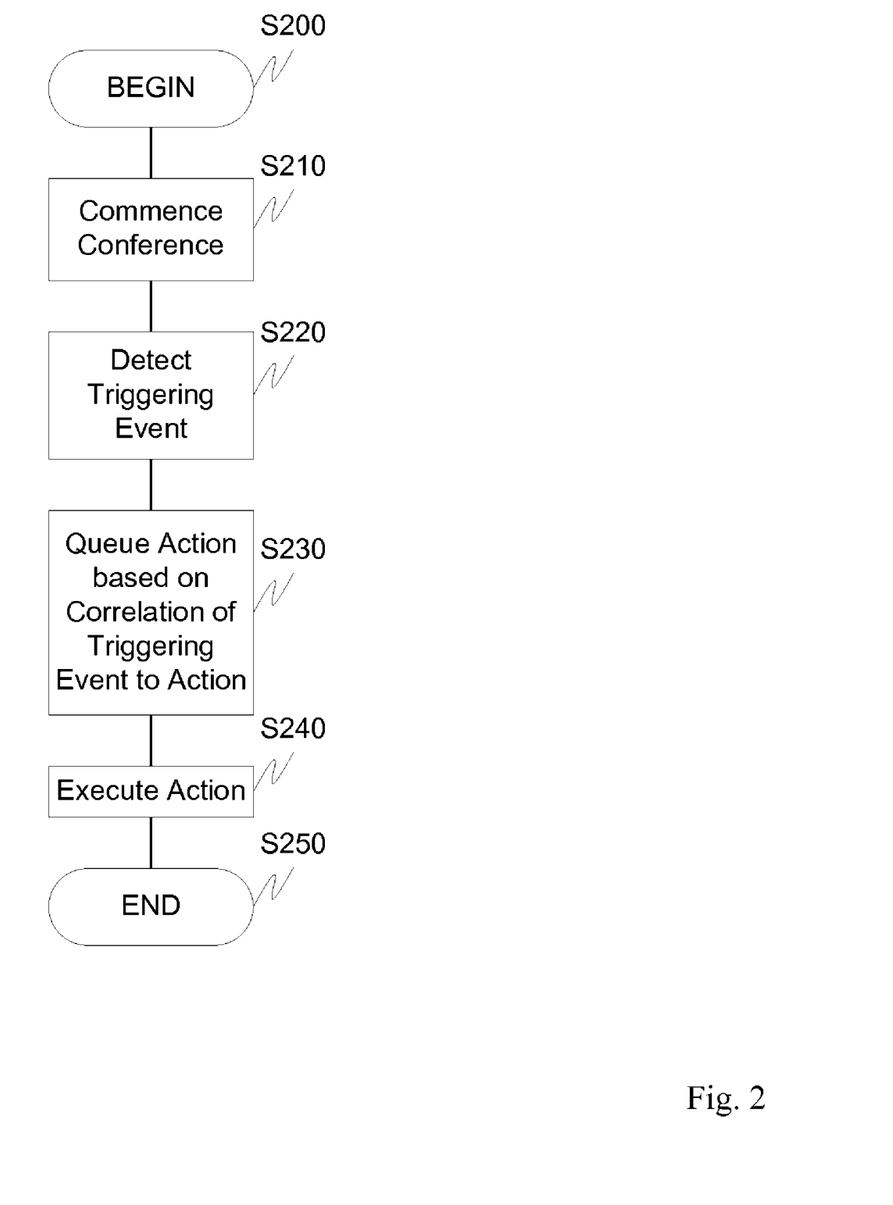
FIG. 2 is a flowchart outlining an exemplary method for detecting triggering events.

FIG. 2 is a flowchart outlining an exemplary method of operation of the alert system 100. In particular, control begins in step S200 and continues to step S210. In step S210, a conference commences. Next, in step S220, a triggering event is detected. Then, in step S230, one or more actions that were correlated to the triggering event are queued in the system. Control then continues to step S240.

In step S240, and upon the system reaching the triggering point where the action was queued, the action is executed with control continuing to step S250 where the control sequence ends.

Figure 3:
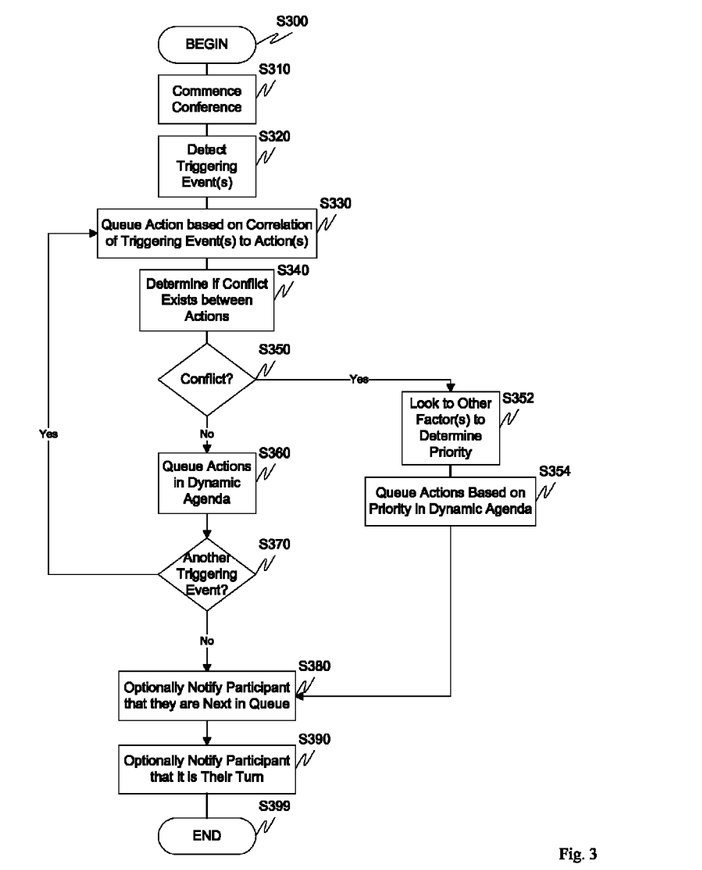
FIG. 3 is a flowchart illustrating a method for resolving conflicts and updating a dynamic agenda.

FIG. 3 is a flowchart outlining another exemplary embodiment of the operation of the alert system 100. In particular, control begins with step S300 and continues to step S310. In step S310, a conference commences. Next, in step S320, one or more triggering events, associated with one or more conference participants, are detected. Then, in step S330, the one or more actions correlated to the one or more detected triggering events are queued in an initial agenda. Control then continues to step S340.

In step S340, a determination is made as to whether a conflict exists between one or more queued actions. If, in step S350, it is determined that a conflict exists, control jumps to step S352 with control otherwise continuing to step S360.

In step S360, one or more actions are queued in a dynamic agenda. Next, in step S370, a determination is made as to whether another triggering event has occurred. If another triggering event has occurred, control jumps back to step S330 with control otherwise continuing to step S380.

If it is determined that a conflict exists, control jumps to step S352 where one or more other factors are considered to determine priority. As discussed, these other factors can be identity of a participant, a rank of a participant, a hierarchy associated with the type of detected action, an indication from a participant as to whether or not their triggering action is high priority or not, one or more rules, or the like. These factors, in step S354, can then be overlaid and used to assist with determining where the action should be queued in the dynamic agenda. Control then continues to step S380.

In step S380, a participant can optionally be notified that they are next in the queue. As an alternative, or in addition, the dynamic agenda can be provided, in whole or in part, to one or more of the conference participants that provides them visibility as to where their detected triggering event, and corresponding action, was placed in the dynamic agenda. Next, in step S390, one or more of a countdown, next-in-line identification, or other notification can be provided to one or more of the conference participants indicating that they are getting close to, or it is their turn, based on progress through the dynamic agenda. Control then continues to step S399 where the control sequence ends.

As another optional embodiment, the triggering event is correlatable to a conference control function. For example, a certain gesture can indicate that another participant cannot be heard, for example, by a user cupping their hand to their ear, thereby requesting the conference bridge to increase the volume of the channel associated with that speaker. Similarly, the triggering event can be used to provide feedback to another participant, such as a moderator, as to what the conference participants are doing, e.g., dozing off.

As yet another example, a combination of triggering events can be detected, with a certain sequence of triggering events within a certain time frame being correlatable to a function(s) or action(s).

Another example weighs triggering actions from one or more participants in an effort to determine what is best for the conference as a whole. For example, if numerous participants are indicating that they are experiencing feedback, the system, such as a conference bridge, can invoke one or more filters to combat the feedback.

Another option is that the triggering event is correlatable to a request to initiate the running of an application(s), such as a white-boarding application.

The various embodiments include components, methods, processes, systems and/or apparatus substantially as depicted and described herein, including various embodiments, sub-combinations, and subsets thereof. Those of skill in the art will understand how to make and use the present invention after understanding the present disclosure. The disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features are grouped together in one or more embodiments for the purpose of streamlining the disclosure. This method of disclosure is not to be interpreted as reflecting an intention that the claimed subject matter requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhancing communications. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A conferencing method in a conferencing environment which includes a plurality of conference participants comprising:
   detecting at least one triggering event at least one participant endpoint;
   correlating the at least one triggering event to one or more actions;
   queuing the one or more actions within the conference; and
   updating a dynamic agenda of a flow of the conference based on the at least one triggering event.

2. The method of claim 1, further comprising determining if a conflict exists between the one or more actions and one or more other detected or scheduled actions.

3. The method of claim 1, wherein the dynamic agenda of the flow of the conference is distributed to the plurality of conference participants.

4. The method of claim 1, further comprising notifying a conference endpoint of a status of a requested action.

5. The method of claim 1, wherein the one or more actions control one or more aspects of the conferencing environment.

6. The method of claim 1, wherein the at least one triggering event includes one or more of an emotion, gesture, change in facial expression, and movements of the conference participant.

7. The method of claim 1, further comprising resolving conflicts based on one or more of rules, job position, moderator preferences, ranking, priority, and title.

8. One or more means for performing the steps of claim 1.

9. A non-transitory computer-readable medium comprising processor executable instructions that, if executed, perform the steps of claim 1.

10. The method of claim 1, wherein detecting the at least one triggering event comprises detecting a plurality of triggering events and wherein the dynamic agenda of the flow of the conference comprises the plurality of triggering events.

11. The method of claim 1, wherein detecting the at least one triggering event comprises detecting a plurality of triggering events from a plurality of endpoints and wherein the dynamic agenda of the flow of the conference is updated based on the plurality of triggering events.

12. A conferencing system in a conferencing environment which includes a plurality of conference participants comprising:
   one or more of a gesture recognition module and facial recognition module that that detect at least one triggering event at least one participant endpoint;
   a triggering event module that correlates the at least one triggering event to one or more actions;
   a queuing module that queues the one or more actions within the conference; and
   a dynamic agenda module that updates a dynamic agenda of a flow of the conference based on the at least one triggering event.

13. The system of claim 12, wherein the queuing module further determines if a conflict exists between the one or more actions and one or more other detected or scheduled actions.

14. The system of claim 12, wherein the dynamic agenda of the flow of the conference is distributed to the plurality of conference participants.

15. The system of claim 12, further comprising a conference agent module that notifies a conference endpoint of a status of a requested action.

16. The system of claim 12, wherein the one or more actions control one or more aspects of the conferencing environment.

17. The system of claim 12, wherein the at least one triggering event includes one or more of an emotion, gesture, change in facial expression, and movements of the conference participant.

18. The system of claim 12, wherein the queuing module resolves conflicts based on one or more of rules, job position, moderator preferences, ranking, priority, and title.

19. The system of claim 12, wherein a participant endpoint includes a camera, a display and a communications endpoint.

20. A conferencing system in a conferencing environment which includes a plurality of conference participants comprising:
   one or more of a gesture recognition module and facial recognition module that detect at least one triggering event at least one participant endpoint;
   a triggering event module that correlates the at least one triggering event to one or more actions;
   a queuing module that queues the one or more actions within the conference; and
   wherein a combination of triggering events can be detected, with a certain sequence of triggering events within a certain time frame being correlatable to one or more functions; and
   triggering actions from one or more participants are weighed to determine an action for the conference as a whole; or
   the one or more triggering events are correlatable to a request to initiate a running of one or more applications.

* * * * *

UNITED STATES PATENT AND TRADEMARK OFFICE
CERTIFICATE OF CORRECTION

PATENT NO.        : 8,629,895 B2
APPLICATION NO.   : 12/828423
DATED             : January 14, 2014
INVENTOR(S)       : Vandy Lee Page 1 of 1

It is certified that error appears in the above-identified patent and that said Letters Patent is hereby corrected as shown below:

In the Claims:

At Column 9, line 20, after "event at" insert --at-- therein.

At Column 10, line 5, please delete the second occurrence of "that".

At Column 10, line 40, after "event at" insert --at-- therein.

Signed and Sealed this
Seventeenth Day of June, 2014

Michelle K. Lee
*Deputy Director of the United States Patent and Trademark Office*